US010873998B2

United States Patent
Newton et al.

(10) Patent No.: US 10,873,998 B2
(45) Date of Patent: Dec. 22, 2020

(54) METHODS AND APPARATUS FOR CONTROLLING ILLUMINATION OF A MULTIPLE LIGHT SOURCE LIGHTING UNIT

(71) Applicant: SIGNIFY HOLDING B.V., Eindhoven (NL)

(72) Inventors: Philip Steven Newton, Waalre (NL); Bertrand Rigot, Veldhoven (NL); Ramon Antoine Wiro Clout, Eindhoven (NL); Tim Dekker, Eindhoven (NL); Bram Knaapen, Eindhoven (NL); Bartel Marinus Van De Sluis, Eindhoven (NL); Maria Hendrica Verbucken, Uden (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/038,285

(22) PCT Filed: Nov. 7, 2014

(86) PCT No.: PCT/IB2014/065866
§ 371 (c)(1),
(2) Date: May 20, 2016

(87) PCT Pub. No.: WO2015/075596
PCT Pub. Date: May 28, 2015

(65) Prior Publication Data
US 2016/0302275 A1    Oct. 13, 2016

Related U.S. Application Data

(60) Provisional application No. 61/906,481, filed on Nov. 20, 2013.

(51) Int. Cl.
*H05B 33/08*       (2020.01)
*H05B 45/10*       (2020.01)
(Continued)

(52) U.S. Cl.
CPC ............... *H05B 45/10* (2020.01); *F21V 5/04* (2013.01); *F21V 14/003* (2013.01); *G02B 27/30* (2013.01);
(Continued)

(58) Field of Classification Search
CPC ............ H05B 33/0845; H05B 33/0809; F21V 14/003; F21V 5/04; G02B 27/30; F21Y 2103/10; F21Y 2115/10
See application file for complete search history.

(56) References Cited

U.S. PATENT DOCUMENTS 4,009,387 A      2/1977   Nuver
6,769,777 B1 *   8/2004   Dubin ...................... F21V 5/04
                                                          353/38
(Continued)

FOREIGN PATENT DOCUMENTS

CN       101932873 A      12/2010
CN       101998731 A       3/2011
(Continued)

*Primary Examiner* — Seokjin Kim
(74) *Attorney, Agent, or Firm* — Meenakshy Chakravorty

(57) ABSTRACT

The present disclosure is directed to inventive methods and apparatus for lighting control and for providing effects upon activation/deactivation. For example, various methods and apparatus are described for controlling various selected properties of light emitted by an LED-based lighting unit (100) with multiple LEDs (102) using, for example, a dimmer switch (101) and/or a predefined sequence of energizing LEDs.

20 Claims, 8 Drawing Sheets

(51) Int. Cl.
  *H05B 45/37*     (2020.01)
  *F21V 5/04*      (2006.01)
  *F21V 14/00*     (2018.01)
  *G02B 27/30*     (2006.01)
  *F21Y 103/10*    (2016.01)
  *F21Y 115/10*    (2016.01)

(52) U.S. Cl.
  CPC .......... *H05B 45/37* (2020.01); *F21Y 2103/10* (2016.08); *F21Y 2115/10* (2016.08)

(56) References Cited

U.S. PATENT DOCUMENTS

| | | | | |
|---|---|---|---|---|
| 2003/0086265 A1* | 5/2003 | Ilsaka | ..................... | F21V 11/18 362/268 |
| 2004/0212321 A1* | 10/2004 | Lys | ..................... | H05B 39/044 315/291 |
| 2005/0195599 A1* | 9/2005 | Marka | ..................... | F21S 2/005 362/232 |
| 2006/0076908 A1* | 4/2006 | Morgan | ............. | H05B 33/0842 315/312 |
| 2006/0273741 A1* | 12/2006 | Stalker, III | ............. | H05B 47/18 315/291 |
| 2010/0097002 A1* | 4/2010 | Shatford | ............ | H05B 33/0803 315/210 |
| 2010/0289395 A1 | 11/2010 | Sun et al. | | |
| 2010/0308739 A1 | 12/2010 | Shteynberg et al. | | |
| 2011/0101889 A1* | 5/2011 | Lys | ................... | H05B 33/0803 315/312 |
| 2012/0206050 A1* | 8/2012 | Spero | ..................... | H05B 3/008 315/152 |
| 2012/0268013 A1 | 10/2012 | Riesebosch | | |
| 2012/0286666 A1 | 11/2012 | Shteynberg et al. | | |
| 2012/0319616 A1* | 12/2012 | Quilici | ..................... | F21V 5/007 315/294 |
| 2013/0093362 A1 | 4/2013 | Edwards | | |
| 2013/0127353 A1 | 5/2013 | Athalye et al. | | |
| 2013/0270998 A1 | 10/2013 | Pi | | |
| 2014/0015436 A1* | 1/2014 | Vissenberg | ............ | H05B 47/10 315/250 |
| 2015/0009677 A1* | 1/2015 | Catalano | ................... | F21V 7/06 362/296.07 |
| 2015/0054423 A1* | 2/2015 | Tyson | ..................... | H05B 47/19 315/291 |
| 2015/0084542 A1* | 3/2015 | Chen | .................. | H05B 33/0863 315/294 |

FOREIGN PATENT DOCUMENTS

| | | | | | |
|---|---|---|---|---|---|
| JP | | H1081275 A | 3/1989 | | |
| JP | | 2011519468 A | 7/2011 | | |
| JP | | 2011151593 A | 8/2011 | | |
| JP | | 2011181593 A | 9/2011 | | |
| JP | | 2013500549 A | 1/2013 | | |
| JP | | 2013168367 A | 8/2013 | | |
| WO | | 2008142622 A1 | 11/2008 | | |
| WO | | 2012131549 A1 | 10/2012 | | |
| WO | WO | 2012131549 A1 * | 10/2012 | ............. | H05B 37/02 |
| WO | WO- | 2012131549 A1 * | 10/2012 | ............. | H05B 45/10 |
| WO | | 2013041109 A1 | 3/2013 | | |
| WO | | 2013054297 A1 | 4/2013 | | |

\* cited by examiner

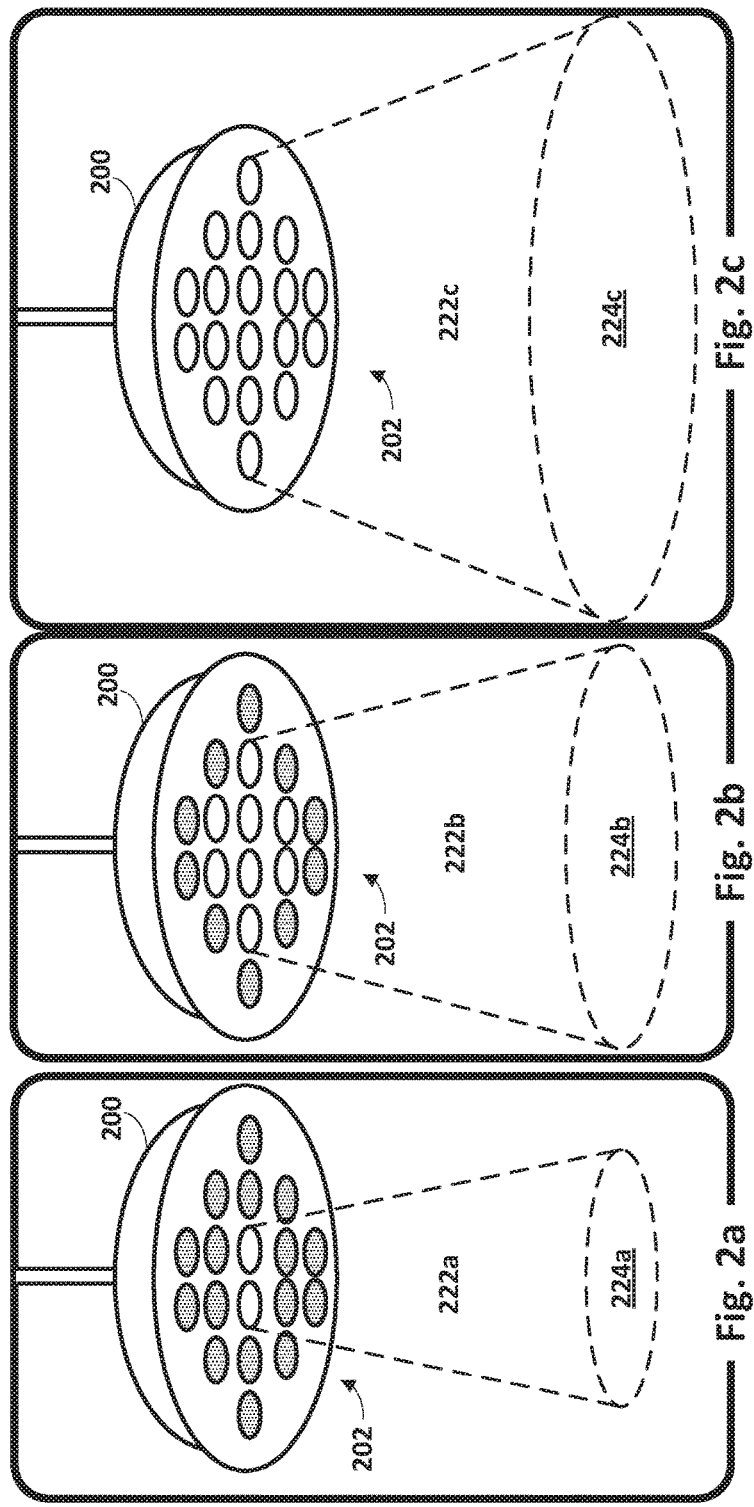
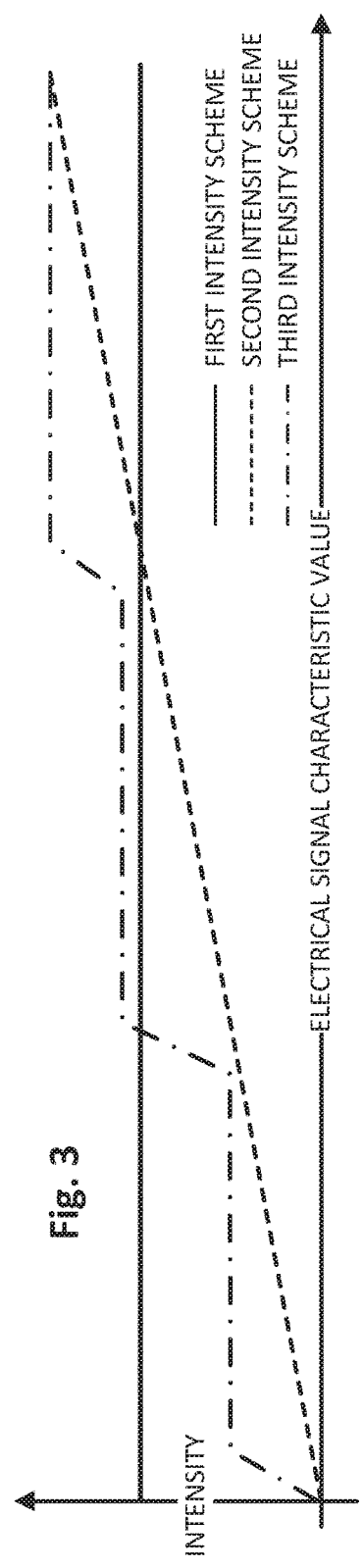

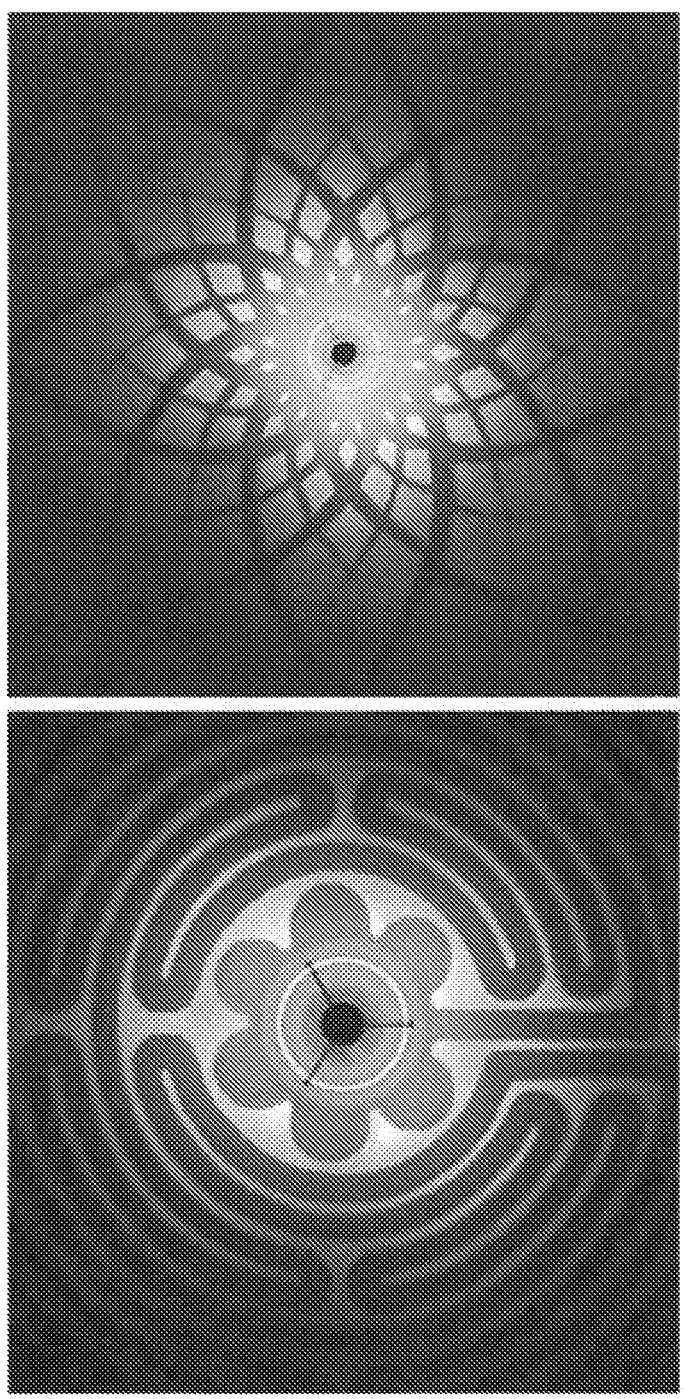

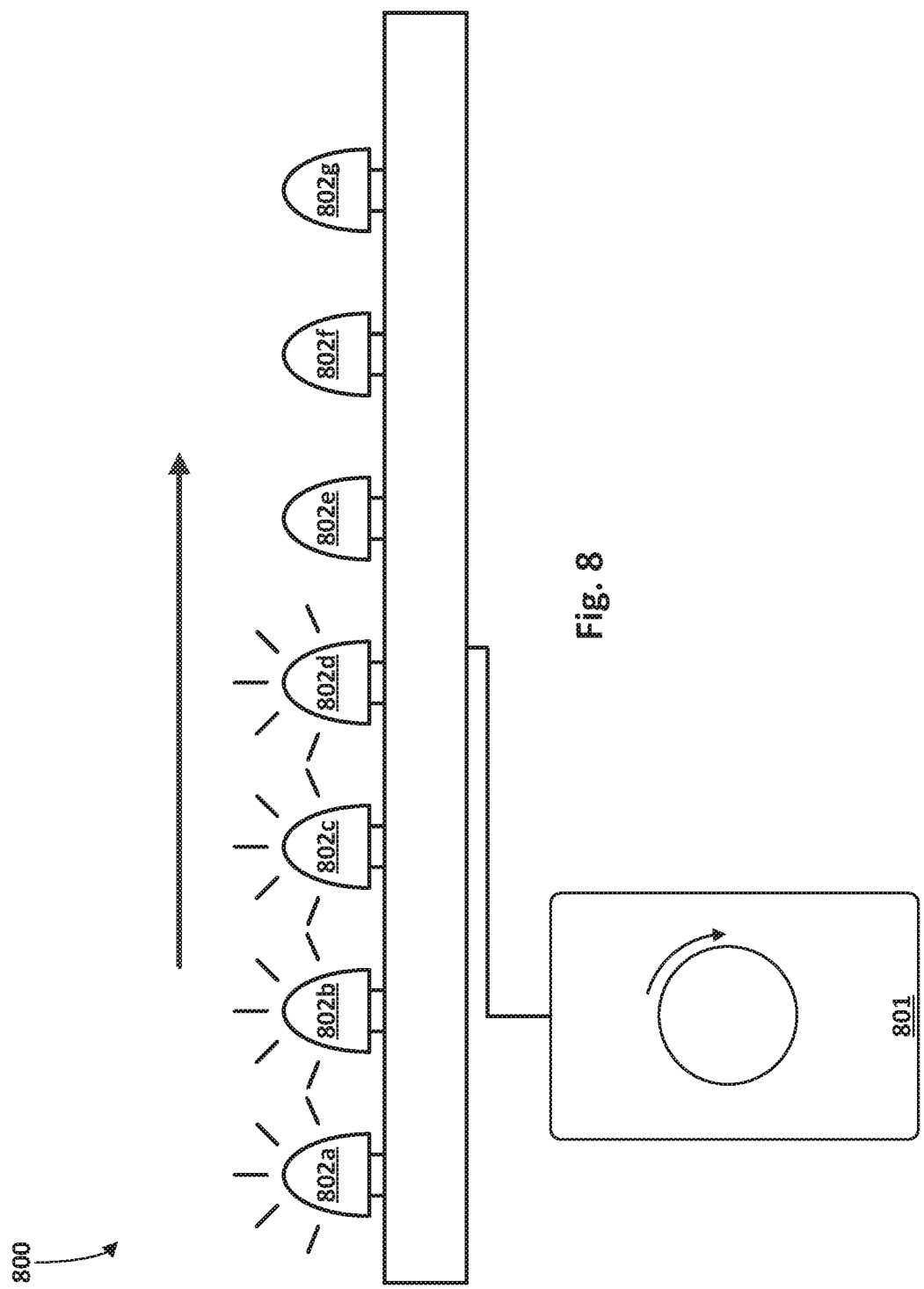

METHODS AND APPARATUS FOR CONTROLLING ILLUMINATION OF A MULTIPLE LIGHT SOURCE LIGHTING UNIT

CROSS-REFERENCE TO PRIOR APPLICATIONS

This application is the U.S. National Phase application under 35 U.S.C. § 371 of International Application No. PCT/IB2014/065866, filed on Nov. 7, 2014, which claims the benefit of U.S. Provisional Patent Application No. 61/906,481, filed on Nov. 20, 2013. These applications are hereby incorporated by reference herein.

TECHNICAL FIELD

The present invention is directed generally to lighting control. More particularly, various inventive methods and apparatus disclosed herein relate to controlling illumination of lighting units having multiple light sources.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects.

Intensity of conventional lighting, such as that produced by incandescent light sources, may be controlled using a dimmer switch. Oftentimes the dimmer switch is thyristor-based, and the intensity of the light sources may be controlled via a switchable phase angle. In some cases, the phase angle is controlled by adjusting a value of a resistor (e.g., a potmeter) in an RC circuit. This results in an output waveform whereby parts of the incoming sine wave are cut. As the root mean square (RMS) voltage of the resulting output waveform decreases, the emitted light may be dimmed.

Dimmers cannot currently be used to control lighting properties of incandescent light sources, other than intensity. For example, dimmers are not used to control how light is distributed by an incandescent lighting unit in a particular area such as a room. However, LED-based lighting units, particularly those incorporating multiple LED-based light sources, may provide an opportunity to control other lighting properties, including but not limited to temperature, saturation, hue, light distribution, and so forth.

In addition, while most people appreciate the creation of theatrical, dynamic lighting effects, most lighting units and fixtures simply switch on and off, without any effects. This may be unpleasant to human eyes.

Thus, there is a need in the art to control various properties of light emitted by an LED-based lighting unit using existing dimmer switches. There is also a need in the art to provide lighting units and fixtures that provide effects upon being energized or deactivated.

SUMMARY

The present disclosure is directed to inventive methods and apparatus for lighting control and for providing effects upon activation/deactivation. For example, various methods and apparatus are described for controlling various selected properties of light emitted by an LED-based lighting unit with multiple LEDs using, for example, a dimmer switch or a predefined sequence of energizing LEDs.

Generally, in one aspect, the invention relates to an LED-based lighting unit that includes a plurality of LEDs; one or more optical elements; and a controller operably coupled with the plurality of LEDs and the optical elements. The controller may be configured to, based on a value of a characteristic of a detected electric signal within a range of possible values: energize a predetermined distribution of the plurality of LEDs selected from a plurality of predetermined distributions; or configure the one or more optical elements to achieve a lighting effect selected from a plurality of predetermined lighting effects.

In various embodiments, the characteristic of the detected electric signal may be a root mean square (RMS) of the electric signal. In various embodiments, the one or more optical elements may include a plurality of collimators that are configurable, based on the value of the detected electric signal characteristic, to define a beam width or angle of light emitted by the plurality of LEDs.

In various embodiments, the plurality of predetermined distributions may be selected so that a width of a light beam produced by the plurality of LEDs corresponds to a position of the value of the electrical signal characteristic within the range of possible values. In various embodiments, the plurality of predetermined distributions may be selected so that an overall intensity of light produced by the plurality of LEDs corresponds to a position of the value of the electrical signal characteristic within the range of possible values. In various embodiments, the plurality of predetermined distributions may be selected so that an angle of a light beam produced by the plurality of LEDs corresponds to a position of the value of the electrical signal characteristic within the range of possible values. In various embodiments, the plurality of predetermined distributions may be selected to cause the plurality of LEDs to produce a plurality of predetermined lighting effect patterns on a surface.

In various embodiments, the electrical signal may include an AC voltage, and the lighting fixture may further include an AC-DC convertor to convert the AC voltage to a DC voltage. In various embodiments, a driver may be implemented and configured to provide, to the plurality of LEDs, a pulse width-modulated current based on the DC voltage and output of the controller.

In various embodiments, the plurality of predetermined distributions may include a plurality of predetermined subsets of the plurality of LEDs. In various embodiments, the plurality of LEDs may include a linear strip of LEDs, and the plurality of predetermined distributions may be selected so that a leading edge of energized LEDs along the strip corresponds to a position of the value of the electrical signal characteristic within the range of possible values.

In various embodiments, the one or more optical elements may include at least one lens that is positioned at an adjustable distance from the plurality of LEDs. The adjustable distance may be selected based on the value of the detected electric signal characteristic. In various embodiments, the one or more optical elements may include a switchable diffusor that is driven based on the value of the detected electric signal characteristic.

In another aspect, the invention relates to a lighting control method that includes detecting, by a controller, an electrical signal associated with a dimmer switch; determining, by the controller, a value of a characteristic of the detected electric signal within a range of possible values; and energizing, by the controller, a predetermined distribution of a plurality of LEDs selected from a plurality of predetermined distributions based on the value of the characteristic; or configuring, by the controller, the one or more optical elements to achieve a lighting effect selected from a plurality of predetermined lighting effects based on the value of the characteristic.

In various embodiments, the characteristic of the detected electric signal may be is a root mean square (RMS) of the electric signal. In various embodiments, configuring the one or more optical elements may include configuring a plurality of collimators to define a beam width or angle of light emitted by the plurality of LEDs, based on the value of the detected electric signal characteristic.

In various embodiments, the electrical signal may include an AC voltage, and the method may further include converting the AC voltage to a DC voltage. In various versions, the method may further include providing, to the plurality of LEDs, a pulse width-modulated current based on the DC voltage and the value of the detected electrical signal characteristic.

In various embodiments, at least one computer-readable medium may be provided that includes instructions that, in response to execution by a controller of a lighting fixture, cause the lighting fixture to perform one or more of the above-described methods.

In another aspect, the invention relates to a lighting unit that includes a plurality of light sources; one or more optical elements; and a controller operably coupled with the plurality of light sources and the optical elements. The controller may be configured to, based on a value of a root mean square of a detected electric signal from a dimmer switch: energize a predetermined distribution of the plurality of light sources selected from a plurality of predetermined distributions; or configure the one or more optical elements to achieve a lighting effect selected from a plurality of predetermined lighting effects.

In various embodiments, the plurality of predetermined distributions may be selected so that a width of a light beam produced by the plurality of sources, an overall intensity of light produced by the plurality of light sources, or an angle of a light beam produced by the plurality of light sources corresponds to a position of the root mean square of the electrical signal within the range of possible root mean squares.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens, collimator), etc.

The term "light source" should be understood to refer to any one or more of a variety of radiation sources, including, but not limited to, LED-based sources (including one or more LEDs as defined above). A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical elements (e.g., diffusing lens, collimators, etc.). Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 2A-C illustrate how example distributions of light sources of a plurality of light sources on a lighting unit may be selectively energized, in accordance with various embodiments.

FIGS. 3-5 depict examples of intensities that may be achieved using various intensity schemes, in accordance with various embodiments.

FIGS. 6 and 7 depict example lighting effects that may be selectively projected onto a surface by lighting units configured with selected aspects of the present disclosure, in accordance with various embodiments.

FIG. 8 depicts another embodiment of a lighting unit having a linear shape.

DETAILED DESCRIPTION

Intensity of conventional lighting, such as that produced by incandescent light sources, may be controlled using a dimmer switch. Oftentimes the dimmer switch is a Thyristor-based, and the intensity of the light sources may be controlled via a switchable phase angle. In some cases, the phase angle is controlled by adjusting a value of a resistor (e.g., a potmeter) in an RC circuit. This results in an output waveform whereby parts of the incoming sine wave are cut. As the root mean square (RMS) voltage of the resulting output waveform decreased, light emitted by an incandescent light source may be dimmed.

Dimmers cannot currently be used to control incandescent lighting properties other than intensity. However, LED-based lighting units, particularly those incorporating multiple LED-based light sources, may provide the opportunity to control other lighting properties, including but not limited to temperature, saturation, hue, light distribution, and so forth.

Thus, Applicants have recognized and appreciated that it would be beneficial to control various properties of light emitted by an LED-based lighting unit using existing dimmer switches. In view of the foregoing, various embodiments and implementations of the present invention are directed to controlling light emitted by a plurality of light sources in a lighting unit based on various characteristics of an electrical signal, e.g., provided by a dimmer switch. Applicants have also recognized and appreciated that it would be beneficial to provide lighting units that, when turned on and off, are aesthetically pleasing.

Figure 1:
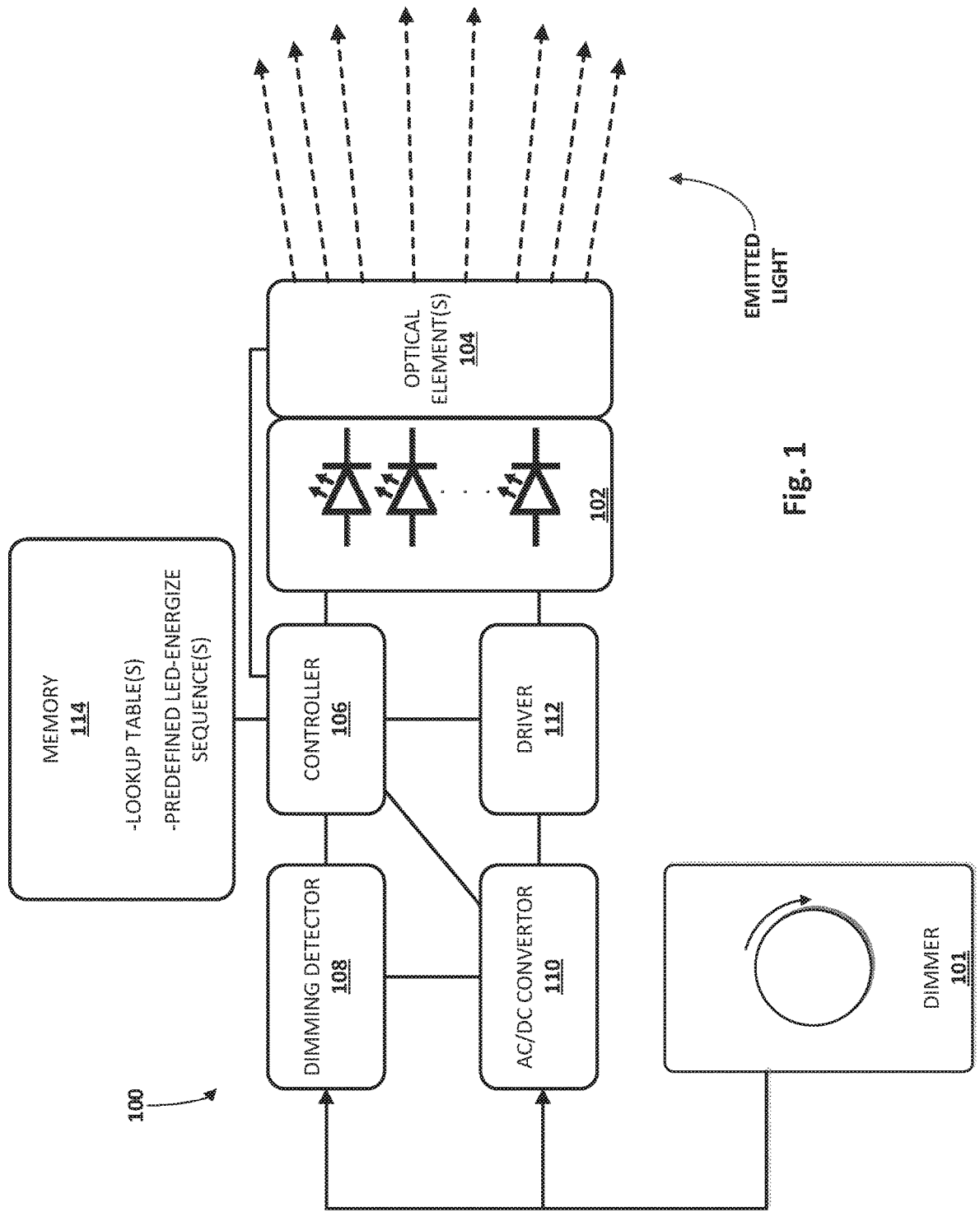
FIG. 1 illustrates components of an example LED-based lighting unit, in accordance with various embodiments.

Referring to FIG. 1, in various embodiments, an LED-based lighting unit 100, also referred to as simply as "lighting unit 100," may be employed in various scenarios, some of which it may be controlled by a dimmer switch 101. In some embodiments, lighting unit 100 may be installable in a conventional lighting socket. In other embodiments, lighting unit 100 may be part of a luminaire that may be battery powered or plugged into AC mains.

LED-based lighting unit 100 may include a plurality of LEDs 102. Plurality of LEDs 102 may include LEDs that, when energized, emit various colors, such as white, amber, red, green, blue, and so forth. In various embodiments, one or more optical elements 104 may be provided to alter or otherwise control light emitted by plurality of LEDs 102. Optical elements 104 may include various types of elements, such as collimators, diffusing lenses, and so forth.

A controller 106 may be operably coupled with various other components of lighting unit 100. For example, in FIG. 1, controller 106 is operably coupled with plurality of LEDs 102 and optical elements 104. In various embodiments, controller 106 may be configured to perform various lighting control operations based on a value of a characteristic of a detected electric signal within a range of possible values. For instance, in various embodiments, controller 106 may energize a predetermined distribution of plurality of LEDs 102 selected from a plurality of predetermined distributions. Additionally or alternatively, controller 106 may configure one or more of optical elements 104 to achieve a lighting effect selected from a plurality of predetermined lighting effects.

In various embodiments, an electrical signal, such as AC mains under control of dimmer switch 101, may be received at a dimming detector 108 and/or an AC/DC convertor 110. Dimming detector 108 may be configured to detect a one or more characteristics of the incoming electrical signal. For instance, in some embodiments, dimmer detector 108 may detect a root mean square (RMS) of the incoming electrical signal. Dimmer detector 108, which in some embodiments may be integrated with controller 106, may provide the RMS value (or another value of a different characteristic of the incoming electrical signal) to controller 106. Controller 106 may perform various lighting control operations based on the received characteristic of the incoming electrical signal.

In some embodiments, controller 106 may operate a driver 112 to control how much current is provided to plurality of LEDs 102. For instance, driver 112 may receive a direct current from AC/DC convertor 110, which may convert AC mains to direct current. Driver 112 may ensure that plurality of LEDs 102 receive a constant current, or at least a tolerable current, as the changing current received from AC/DC convertor 110 may result in unpredictable output by plurality of LEDs 102 at best, and in malfunction of plurality of LEDs 102 at worst.

In various embodiments, controller 106 may cause driver 112 to vary how much current is provided to plurality of LEDs 102 based on one or more characteristics of the incoming electrical signal, such as the value of the electrical signal's RMS. The level of current provided to plurality of LEDs 102 by driver 112 at the behest of controller 106 may dictate, among other things, an intensity of light emitted by plurality of LEDs 102. In some embodiments, driver 112 may be configured to provide, to plurality of LEDs 102, a pulse width-modulated current based on DC voltage from AC/DC convertor 110 and output of controller 106.

In addition to intensity, controller 106 may control other properties of light emitted by plurality of LEDs 102. For example, and as noted above, controller 106 may selectively energize a predetermined distribution of plurality of LEDs 102 selected from a plurality of predetermined distributions. In some embodiments, the plurality of predetermined distributions may include a plurality of subsets of plurality of LEDs 102. The subsets may be selected—e.g., at a design stage, prior to or during manufacturing, or later by an end user—to achieve various lighting effects, patterns, and/or to cause lighting unit 100 to emit light having various properties.

For example, in some embodiments, the plurality of predetermined distributions may be selected so that a width of a light beam produced by plurality of LEDs 102 corresponds to a position of the value of the electrical signal characteristic within the range of possible values. An example of this is depicted in FIGS. 2A-C. In FIG. 2A on the left, a dimmer switch has only been rotated (or moved along a linear path; the manner in which the dimmer switch is operated may vary) by a small amount. As a result, a centrally-located subset of plurality of LEDs 202 on lighting unit 200 are energized, so that the emitted light beam 222a and a resulting lighting effect 224a are relatively narrow. In FIG. 2B, lighting unit 200 has been supplied with a higher RMS than was supplied to lighting unit 200 in FIG. 2A, e.g., as a result of the dimmer switch being rotated/moved further. Thus, it now energizes a larger subset of eight LEDs of plurality of LEDs 202. Accordingly, the emitted light beam 222b and the resulting lighting effect 224b are wider than 222a and 224a, respectively. Supplied with an even higher RMS than was supplied to lighting unit 200 in FIGS. 2A and B, lighting unit 200 in FIG. 2C on the right has all of its plurality of LEDs 202 energized. Thus, the emitted light beam 222c and the resulting lighting effect 224c are wider than 222a, 222b and 224a, 224b, respectively.

Controller 106 may do more than selectively energize distributions of plurality of LEDs 102 to vary a width of a light beam. For instance, in some embodiments, the plurality of predetermined distributions may be selected so that an overall intensity of light produced by the plurality of LEDs corresponds to a position of a value of a detected electrical signal characteristic within a range of possible values. In yet other embodiments, the plurality of predetermined distributions may be selected so that an angle of a light beam produced by the plurality of LEDs corresponds to a position of a value of a detected electrical signal characteristic within a range of possible values. For instance, a subset of LEDs on one side of LED-based lighting unit 100 may be energized when dimmer switch 101 is operated to provide an RMS voltage within a particular range. Another subset of LEDs on another side of LED-based lighting unit 100 may be energized when dimmer switch 101 is operated to provide an RMS voltage within a different range. Thus, the angle of light emitted by LED-based lighting unit 100 may various depending on a relative position of dimmer switch 100. In yet other embodiments, the plurality of predetermined distributions may be selected to cause plurality of LEDs 102 to produce a plurality of predetermined lighting effect patterns on a surface.

FIG. 3 is a graph depicting example overall intensity levels (vertical axis) that may be emitted by plurality of LEDs 102 in response to various values or ranges of values of a characteristic of an electrical signal (horizontal axis). When a first intensity scheme is employed, the overall intensity may remain the same regardless of a value of the electrical signal characteristic or how many of plurality of LEDs 102 are illuminated. Thus, for instance, in FIGS. 2A-C, as more LEDs are energized, each individual LED may be energized less, so that the cumulative overall intensity remains the same.

Figure 4:
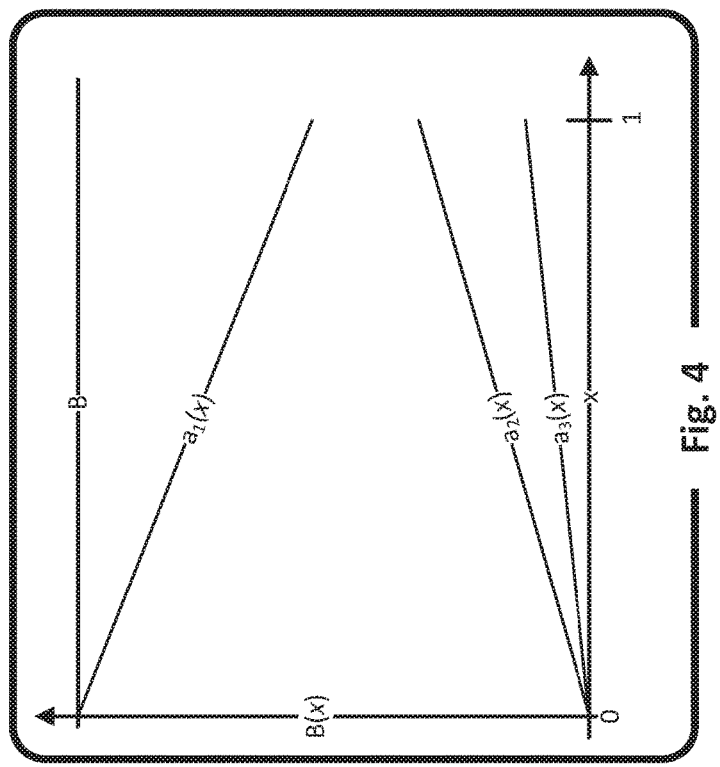

An example of this is depicted FIG. 4. Assume x (horizontal axis) is a state of dimmer 110, normalized to be between zero and one. Assume there are N=3 predetermined distributions, or subsets, of plurality of LEDs 102 that are each individually controllable by controller 106. Assume an overall light output B(x) (vertical axis) as a function of the state of dimmer 110. Assume further that controller 106 generates control signals $a_i(x)$ for each subset i of the plurality of predetermined distributions, wherein $0 \leq i \leq N$, such that $B(x) = a_1(x) + a_2(x) + \ldots + a_N(x)$. If a constant overall intensity is desired, such as is demonstrated by the first intensity scheme of FIG. 3, then formulas such as the following may be employed:

$$a_1(x) = B + \alpha_1 \times x$$

$$a_2(x) = \alpha_2 \times x$$

$$a_3(x) = \alpha_3 \times x$$

wherein $\alpha_i$ is the gradient or slope (e.g., da/dx) of the graph. Because the intensity is to remain constant, $a_1(x) + a_2(x) + a_2$ (x)=B for all 0≤x≤1. Thus, the functions shown in FIG. 4 may be implemented to insure a constant overall intensity B.

In some embodiments, to compensate for nonlinear response to luminance by humans, the function B(x) may be defined as a nonlinear function, e.g., $B(x)=x^{2.2}$, and functions $a_i(x)$ may be selected so that they sum to B(x).

Referring back to FIG. 3, if a second intensity scheme is employed, the overall intensity may increase in a linear fashion as more distributions of plurality of LEDs are selectively energized. Thus, in FIGS. 2A-C, the brightness of energized LEDs within a subset may be gradually increased. Once the LEDs of that subset are energized to emit maximum intensity, a next subset of LEDs (e.g., 202b) may additionally be energized to gradually increase intensity until all those LEDs are emitting maximum intensity. More subsets may follow in the same manner, until all LEDs are energized to emit a maximum intensity.

Figure 5:
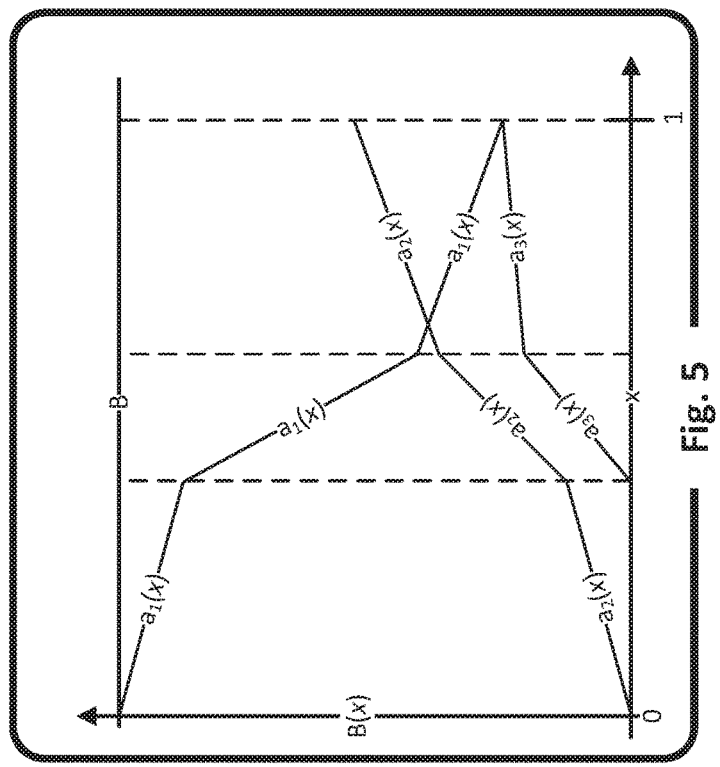

If a third, "stepwise" intensity scheme is employed, overall intensity may be increased in steps. For instance, controller 106 may include in memory 114 a lookup table that maps ranges of values of various electrical signal characteristics (e.g., RMS) to various lighting distributions. Thus, while the RMS is within a first range, as shown by the first "step" in FIG. 3, the intensity of light emitted by plurality of LEDs 102 may remain the same. Upon entering another range, as shown by the second "step" in FIG. 3, the intensity of light emitted by the plurality of LEDs may be increased, e.g., by controller 106 causing driver 112 to supply more current to already energized LEDs or by stepwise energizing new subsets of LEDs. In some such embodiments, the functions $a_i(x)$ may be selected as stepwise linear functions that sum to B(x). An example of such functions $a_i(x)$ is depicted in FIG. 5.

Referring back to FIG. 1, and as noted above, in addition to or instead of selectively energizing distributions of LEDs, in various embodiments, controller 106 may configure one or more optical elements 104 to affect light emitted by plurality of LEDs 102. For instance, in embodiments where the one or more optical elements include a plurality of collimators, controller 106 may cause the collimators, based on the value of the detected electric signal characteristic, to define a beam width or angle of light emitted by plurality of LEDs 102. In other embodiments, lenses such as diffusing lenses may be altered, rotated, moved (e.g., towards or away one or more of plurality of LEDs 102), or otherwise configured to achieve a lighting effect selected from a plurality of predetermined lighting effects. In some embodiments, the plurality of predetermined lighting effects may include a plurality of predetermined lighting effect patterns that may be projected onto a surface by configuring optical elements 104 in various ways.

FIGS. 6 and 7 depict two examples of such lighting effect patterns that may be achieved by altering one or more optical elements 104 and/or by energizing a distribution of plurality of LEDs 102 selected from a plurality of distributions. A connected dimmer switch (e.g., 101) may be used to increase or decrease a value of the electrical signal characteristic, which in turn may adjust one or more optical elements 104, such as one or more lenses or collimators, to create the shown lighting effects or other, similar lighting effects. In some cases, operation of the dimmer switch may cause the appearance of the lighting effect to morph into other appearances, e.g., in a manner similar to that of a kaleidoscope. In some embodiments, optical elements 104 may include a switchable diffusor that is driven based on a value of the electric signal characteristic detected by, e.g., dimming detector 108.

While the embodiment depicted in FIGS. 2A-C includes LEDs arranged in a circular pattern, this is not meant to be limiting. Lighting unit 100 may have plurality of LEDs 102 arranged in other ways as well. Referring now to FIG. 8, an alternative embodiment of an LED-based lighting unit 800 is depicted. Most components of LED-based lighting unit 800 are similar to those of LED-based lighting unit 100 in FIG. 1, and are not depicted in FIG. 8. LED-based lighting unit 800 includes a plurality of LEDs 802a-g arranged as a linear strip of LEDs.

Similar to plurality of LEDs in FIGS. 1-2, in embodiments like the one shown in FIG. 8, a controller (e.g., 106) may energize a distribution of plurality of LEDs 802a-g selected from a plurality of predetermined distributions. In some embodiments, the plurality of predetermined distributions may be selected so that a leading edge of energized LEDs along the strip—e.g., those LEDs behind which LEDs are lit or have been lit—corresponds to a position of the value of the electrical signal characteristic within the range of possible values. In FIG. 8, for instance, LEDs 802a-d are already energized, and LEDs 802e-g are not yet energized. Thus, the leading edge (not depicted) falls between LEDs 802d and 802e. As dimmer switch 801 is turned clockwise (or counter clockwise; the direction of rotation or movement of the switch is immaterial), LEDs 802e-g may be energized in sequence, in effect moving the leading edge of energized LEDs to the right.

Figure 9:
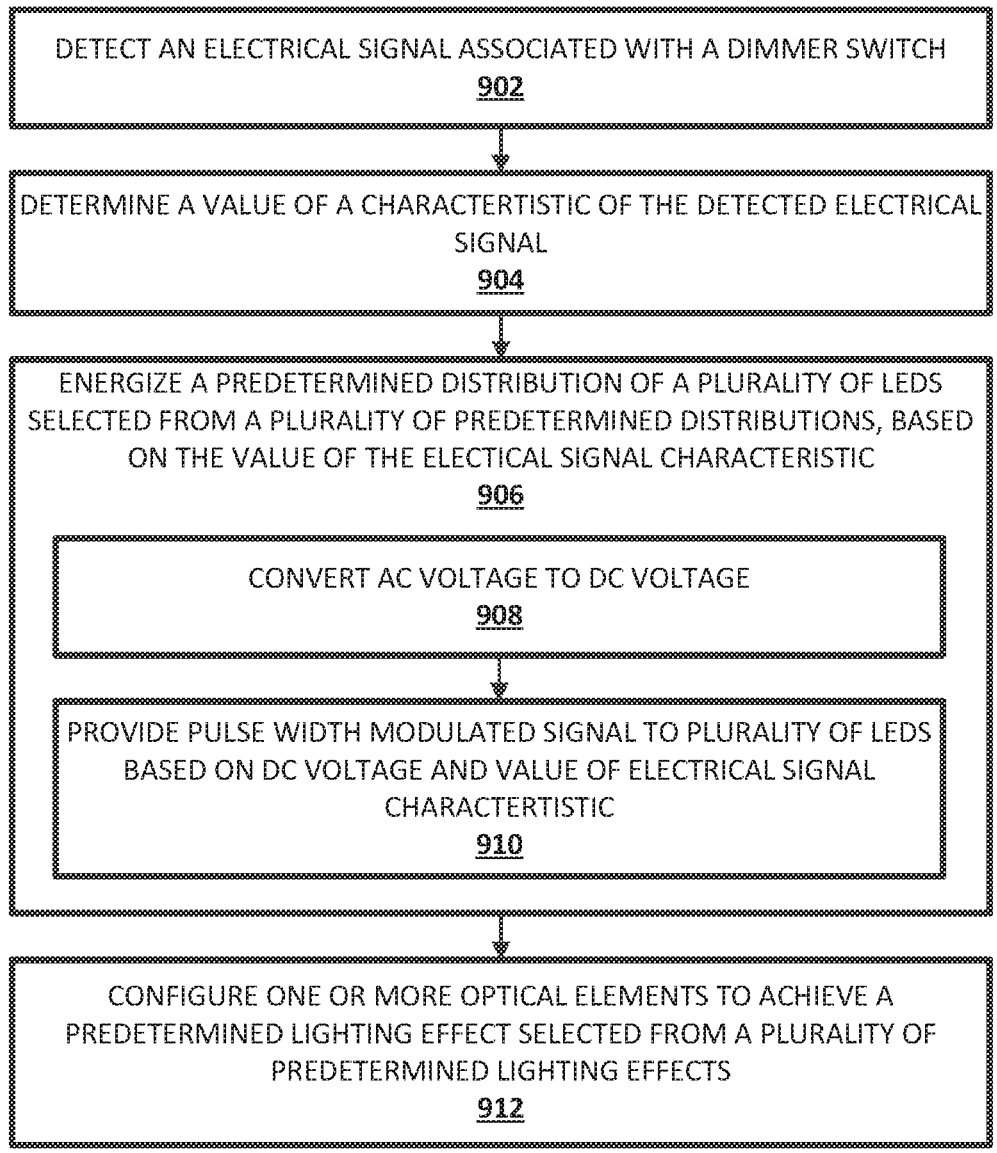
FIG. 9 depicts an example method for controlling a lighting unit having a plurality of lighting sources, in accordance with various embodiments.

FIG. 9 depicts an example method 900 that may be implemented by an LED-based lighting unit such as 100, 200 or 800, in accordance with various embodiments. At block 902, an electrical signal, e.g., received from a dimmer switch (e.g., 101, 801) may be detected, e.g., by controller 106 and/or dimming detector 108. At block 904, a value of a characteristic of the detected electrical signal, such as its RMS, may be determined, e.g., by controller 106.

At block 906, a predetermined distribution of a plurality of LEDs (e.g., 102, 202, 802) selected from a plurality of predetermined distributions of the plurality of LEDs may be energized, e.g., by controller 106. For example, in some embodiments, at block 908, an AC voltage (e.g., AC mains) may be converted to DC, e.g., by AC/DC convertor 110. At block 910, a pulse-width modulated signal may be provided, e.g., by controller 106 and/or driver 112, to the plurality of LEDs based on the DC voltage received from AC/DC convertor 110 and/or a value of the electrical signal characteristic value determined at block 904.

In various embodiments, in addition to or instead of the operations at blocks 906-910, at block 912, one or more optical elements (e.g., 104) may be configured, e.g., by controller 106, to achieve a predetermined lighting effect selected from a plurality of predetermined lighting effects. For example, a distance between a lens and the plurality of LEDs may be adjusted, e.g., by controller 106, based on the value of the detected electric signal characteristic. As another example, a switchable diffusor may be driven, e.g., by controller 106, based on the value of the detected electric signal characteristic. As yet another example, one or more collimators may be adjusted, e.g., by controller 106, based on the value of the detected electric signal characteristic. In various embodiments, a plurality of predetermined configurations of optical elements may be mapped, e.g., via a lookup table in memory 114, to values or ranges of values of the detected electrical signal characteristic.

In another aspect, a lighting unit having a plurality of light sources, such as LED-based lighting unit 100 and its plurality of LEDs 102, may be configured to employ a predefined LED-energize sequence. That way, when the lighting unit is turned on or off, more aesthetically pleasing transition is achieved.

Referring back to FIG. 1, one or more predefined LED-energize sequences may be stored in memory. An LED-energize sequence may include any information or instructions configured to cause controller 106 to selectively energize or deactivate plurality of LEDs 102 in a predefined (e.g., aesthetically pleasing) manner. In some embodiments, the LED-energize sequence may include one or more time intervals for which controller 106 should pause between energizing/deactivating individual LEDs of plurality of LEDs 102, e.g., response to receiving a power on or off signal.

One example of how an LED-energize sequence may be employed can be observed in FIGS. 2A-C. Imagine that, instead of being caused by operation of dimmer switch 101, the three lighting states from left-to-right are implemented as part of an LED-energize sequence that is employed when lighting unit 100 is powered up. Thus, for instance, in FIG. 2A on the left, a centrally-located subset of two LEDs on the lighting unit 200a are energized first. After a pause of a predetermined time interval (e.g., one tenth of a second), a larger subset of eight LEDs has been energized, as shown in FIG. 2B in the middle. After another pause for the same or a different predetermined time interval, all LEDs 202c are energized, as shown in FIG. 2C on the right. Transitioning between these sequences when turning lighting unit on may be more aesthetically pleasing than simply turning all LEDs on simultaneously. The same or a different predefined LED-energize sequence stored in memory 114 may cause lighting unit 200 to deactivate plurality of LEDs in a similar step-by-step manner, except in reverse.

Figure 10:
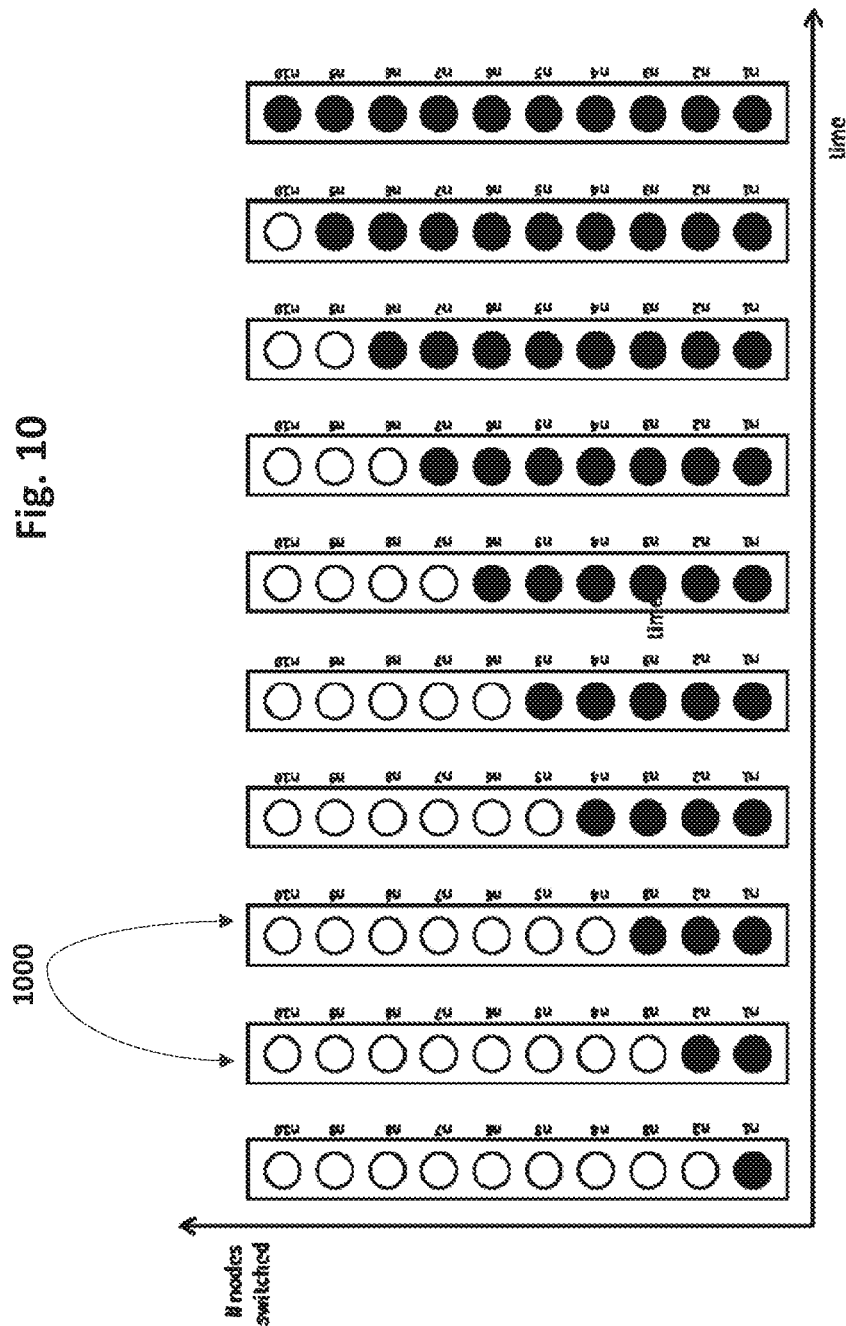
FIG. 10 depicts an example of how LEDs of a linear lighting unit may be selectively energized pursuant to a predefined LED-energize sequence, in accordance with various embodiments.

Another example of how a predefined LED-energize sequence may be employed is depicted in FIG. 10. In this example, a lighting unit 1000 having a linear shape similar to that of FIG. 8 is shown at various stages of its predefined LED-energize sequence. The horizontal axis represents time. Thus, as time elapses, more and more LEDs of lighting unit 1000 are illuminated, until all are illuminated on the far right.

In various embodiments, a predefined LED-energize sequence may include pauses of different time intervals between energizing (or deactivating) LEDs or groups of LEDs. For example, in some embodiments, a pause time interval may grow progressively longer or shorter as more LEDs are energized, e.g., to achieve a dramatic effect. In other embodiments, the pause time intervals may be predefined to various patterns or rhythms, e.g., to be synchronized to correspond to a musical number. In some embodiments, lighting unit 100 may include audible output components such as speakers (not shown), and may cause sound corresponding to the predefined LED-energize sequence to be output. In some cases, the audible output may be soft and/or subtle. This may result in a multi-sensory switching experience.

In various embodiments, predefined LED-energize sequences may be installed into memory 114 during manufacture, during installation (e.g., as part of a commissioning process), or later, e.g., by user configuration.

In various embodiments, multiple lighting units may be configured to communicate with each other using various communication technologies, including but not limited to ZigBee, coded light, near field communication (NFC), radio frequency identification (RFID), WiFi (e.g., WiFi Direct), cellular (e.g., 3G, 4G, 5G, GSM, etc.), Bluetooth, and so forth. In such embodiments, the lighting units 100 may be configured to align or otherwise adapt their predefined LED-energize sequences with each other. In this manner, when two (or more) lighting units 100 are installed adjacent to each other, a single combined LED-energize sequence may be generated and used to dictate collective energizing or deactivation of all the LEDs of all the lighting units.

Figure 11:
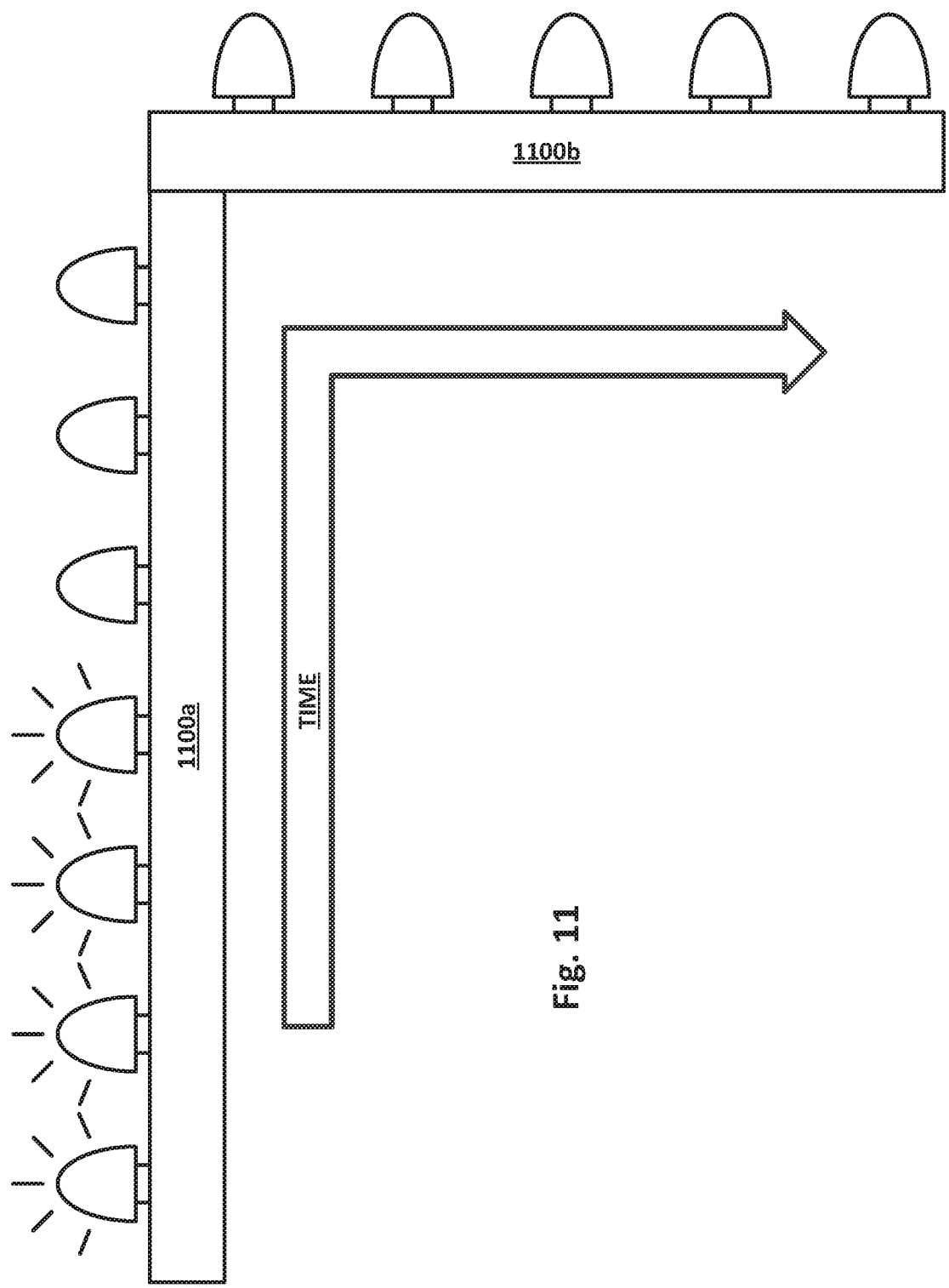
FIG. 11 depicts how multiple lighting units configured with selected aspects of the present disclosure may be operably coupled, in accordance with various embodiments.

An example of this is shown in FIG. 11. A first lighting unit 1100a (which may be configured with selected aspects of the present disclosure) is operably coupled with a second lighting unit 1100b (which also may be configured with selected aspects of the present disclosure). Once connected as shown (which may be physical, as depicted, or wireless), predefined LED-energize sequences of the two separate lighting units may be combined into a single sequence that causes the LEDS to be energized in the sequence shown by the "time" arrow. In FIG. 11, the first four LEDs on the top right are energized, and the rest will follow in the sequence demonstrated by the "time" arrow. Of course it should be understood that this is merely one example sequence, and numerous others may be employed.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Reference numerals appearing in the claims between parentheses, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An LED-based lighting unit, comprising:
a plurality of LEDs comprising a given LED;
one or more optical elements; and
a controller operably coupled with the plurality of LEDs and the optical elements, the controller associated with a memory comprising a lookup table that maps ranges of possible values of electric signal characteristics to a plurality of predetermined configurations of said one or more optical elements and lighting distributions, wherein, in said lookup table, a first value of said possible values is mapped to a first light output ultimately contributed by the given LED at said first value in a first configuration of said plurality of predetermined configurations and a second value of said possible values is mapped to a second light output ultimately contributed by the given LED, which is different from said first light output, at said second value in a second configuration of said plurality of predetermined configurations, the controller configured to:
determine a value of a characteristic of a detected electric signal within the ranges of possible values; and
energize a predetermined distribution of the plurality of LEDs in response to selecting the predetermined distribution from a plurality of predetermined distributions of the plurality of LEDs based on the value of the characteristic, or
configure the one or more optical elements to achieve a lighting effect selected from a plurality of predetermined lighting effects based on the value of the characteristic.

2. The LED-based lighting unit of claim 1, wherein the characteristic of the detected electric signal is a root mean square (RMS) of the electric signal.

3. The LED-based lighting unit of claim 1, wherein the one or more optical elements comprises a plurality of collimators that are configurable, based on the value of the detected electric signal characteristic, to define a beam width or angle of light emitted by the plurality of LEDs.

4. The LED-based lighting unit of claim 1, wherein the plurality of predetermined distributions are selected so that a width of a light beam produced by the plurality of LEDs corresponds to a position of the value of the electric signal characteristic within the range of possible values.

5. The LED-based lighting unit of claim 1, wherein the plurality of predetermined distributions are selected so that an overall intensity of light produced by the plurality of LEDs corresponds to a position of the value of the electric signal characteristic within the range of possible values.

6. The LED-based lighting unit of claim 1, wherein the plurality of predetermined distributions are selected so that an angle of a light beam produced by the plurality of LEDs corresponds to a position of the value of the electric signal characteristic within the range of possible values.

7. The LED-based lighting unit of claim 1, wherein the plurality of predetermined distributions are selected to cause the plurality of LEDs to produce a plurality of predetermined lighting effect patterns on a surface.

8. The LED-based lighting unit of claim 1, wherein the electric signal comprises an AC voltage, and the lighting fixture further comprises an AC-DC convertor to convert the AC voltage to a DC voltage.

9. The LED-based lighting unit of claim 8, further comprising a driver configured to provide, to the plurality of LEDs, a pulse width-modulated current based on the DC voltage and output of the controller.

10. The LED-based lighting unit of claim 1, wherein the plurality of predetermined distributions comprise a plurality of predetermined subsets of the plurality of LEDs.

11. The LED-based lighting unit of claim 1, wherein the plurality of LEDs comprise a linear strip of LEDs, and the plurality of predetermined distributions are selected so that a leading edge of energized LEDs along the strip corresponds to a position of the value of the electric signal characteristic within the range of possible values.

12. The LED-based lighting unit of claim 1, wherein the one or more optical elements comprises at least one lens that is positioned at an adjustable distance from the plurality of LEDs, wherein the adjustable distance is selected based on the value of the detected electric signal characteristic.

13. The LED-based lighting unit of claim 1, wherein the one or more optical elements comprises a switchable diffusor that is driven based on the value of the detected electric signal characteristic.

14. A lighting control method, comprising:
associating a memory with a controller, said memory comprising a lookup table that maps ranges of possible values of electric signal characteristics to a plurality of predetermined configurations of one or more optical elements and lighting distributions, wherein, in said lookup table, a first value of said possible values is mapped to a first light output ultimately contributed by a given LED at said first value in a first configuration of said plurality of predetermined configurations and a second value of said possible values is mapped to a second light output ultimately contributed by the given LED, which is different from said first light output, at said second value in a second configuration of said plurality of predetermined configurations;
detecting, by said controller, an electric signal associated with a dimmer switch;
determining, by the controller, a value of a characteristic of the detected electric signal within a range of possible values; and
performing at least one of:
a) energizing, by the controller, a predetermined distribution of a plurality of LEDs, including said given LED, in response to selecting the predetermined distribution from a plurality of predetermined distributions of the plurality of LEDs based on the value of the characteristic; or
b) configuring, by the controller, one or more optical elements to achieve a lighting effect selected from a plurality of predetermined lighting effects based on the value of the characteristic.

15. The lighting control method of claim 14, wherein configuring the one or more optical elements comprises configuring a plurality of collimators to define a beam width or angle of light emitted by the plurality of LEDs, based on the value of the detected electric signal characteristic.

16. A lighting unit, comprising:
a plurality of light sources comprising a given light source;
one or more optical elements; and
a controller operably coupled with the plurality of light sources and the optical elements, the controller associated with a memory comprising a lookup table that maps ranges of possible values of electric signal characteristics to a plurality of predetermined configurations of said one or more optical elements and lighting distributions, wherein, in said lookup table, a first value of said possible values is mapped to a first light output ultimately contributed by a given light source at said first value in a first configuration of said plurality of predetermined configurations and a second value of said possible values is mapped to a second light output ultimately contributed by the given light source, which is different from said first light output, at said second value in a second configuration of said plurality of predetermined configurations, the controller configured to perform, based on a value of a root mean square of a detected electric signal from a dimmer switch, at least one of:
energizing a predetermined distribution of the plurality of light sources in response to selecting said predetermined distribution from a plurality of predetermined distributions of the plurality of light sources; or
configuring the one or more optical elements to achieve a lighting effect selected from a plurality of predetermined lighting effects.

17. The lighting unit of claim 16, wherein the plurality of predetermined distributions are selected so that a width of a light beam produced by the plurality of sources corresponds to a position of the root mean square of the electric signal within the range of possible root mean squares.

18. The lighting unit of claim 16, wherein the plurality of predetermined distributions are selected so that an overall intensity of light produced by the plurality of light sources corresponds to a position the root mean square of the electric signal within the range of possible root mean squares.

19. The lighting unit of claim 16, wherein the plurality of predetermined distributions are selected so that an angle of a light beam produced by the plurality of light sources corresponds to a position of the root mean square of the electric signal within the range of possible root mean squares.

20. The LED-based lighting unit of claim 1, wherein said first and second light outputs are dependent on said first and second values in accordance with a step function.

* * * * *